United States Patent
Twigg

(10) Patent No.: US 7,404,933 B2
(45) Date of Patent: Jul. 29, 2008

(54) DIESEL EXHAUST SYSTEM INCLUDING NOX-TRAP

(75) Inventor: Martyn Vincent Twigg, Cambridge (GB)

(73) Assignee: Johnson Matthey Public Limited Company, London (GB)

( * ) Notice: Subject to any disclaimer, the term of this patent is extended or adjusted under 35 U.S.C. 154(b) by 529 days.

(21) Appl. No.: 10/297,729

(22) PCT Filed: Jun. 6, 2001

(86) PCT No.: PCT/GB01/02483

§ 371 (c)(1),
(2), (4) Date: Sep. 4, 2003

(87) PCT Pub. No.: WO01/94760

PCT Pub. Date: Dec. 13, 2001

(65) Prior Publication Data

US 2004/0028587 A1   Feb. 12, 2004

(30) Foreign Application Priority Data

Jun. 6, 2000   (GB)   ................................. 0013609.3

(51) Int. Cl.
*B01D 50/00*   (2006.01)
(52) U.S. Cl. ..................................... 422/177
(58) Field of Classification Search .............. 422/168, 422/171, 177, 178
See application file for complete search history.

(56) References Cited

U.S. PATENT DOCUMENTS

| | | | |
|---|---|---|---|
| 4,902,487 A | 2/1990 | Cooper et al. | |
| 5,010,051 A * | 4/1991 | Rudy | 502/304 |
| 5,388,406 A * | 2/1995 | Takeshima et al. | 60/297 |
| 5,738,832 A * | 4/1998 | Dogahara et al. | 422/171 |
| 5,800,793 A | 9/1998 | Cole | |
| 6,074,973 A * | 6/2000 | Lampert et al. | 502/60 |
| 6,087,295 A * | 7/2000 | Kharas et al. | 502/300 |
| 6,589,901 B2 * | 7/2003 | Yamamoto et al. | 502/65 |
| 6,863,874 B1 * | 3/2005 | Twigg | 423/210 |

FOREIGN PATENT DOCUMENTS

| | | |
|---|---|---|
| EP | 0 341 832 A2 | 11/1989 |
| EP | 0 540 280 A1 | 5/1993 |
| EP | 0 560 991 A1 | 9/1993 |
| EP | 0 758 713 A1 | 2/1997 |
| WO | WO-97/43031 | 11/1997 |
| WO | WO-97/43034 | 11/1997 |
| WO | WO 00/21647 * | 4/2000 |

OTHER PUBLICATIONS

Abstract of Japanese Patent No. 2000213336 A (published Aug. 2, 2000).
International Search Report dated Oct. 2, 2001, from corresponding International Application No. PCT/GB01/02483.
British Search Report dated Nov. 30, 2000, from U.K. Priority Application No. 0013609.3.

* cited by examiner

*Primary Examiner*—Edward M Johnson
(74) *Attorney, Agent, or Firm*—RatnerPrestia

(57) ABSTRACT

An exhaust system for a diesel engine, which engine being operable in a plurality of modes including an idling mode, wherein the engine emits a relatively cool exhaust gas, and a running mode, wherein the engine emits a relatively hot exhaust gas, includes a solid NOx absorbent, whereby NOx is absorbed by the NOx absorbent during the idling mode and is desorbed and passed to atmosphere during the running mode and/or during acceleration from idling to running as the temperature of the exhaust gas increases, wherein during all modes the engine runs lean and the exhaust gas composition is lambda>1.

12 Claims, 4 Drawing Sheets

DIESEL EXHAUST SYSTEM INCLUDING NOX-TRAP

This application is the U.S. national phase application of PCT International Application No. PCT/GB01/02483.

FIELD OF THE INVENTION

The present invention relates to an exhaust system for a diesel engine, and in particular to an exhaust system including a NOx-trap or NOx absorbent.

BACKGROUND OF THE INVENTION

Diesel engines produce an exhaust gas including inter alia carbon monoxide (CO), hydrocarbons (HC), soot and nitrogen oxides (NOx), which NOx including nitrogen oxide (NO) and nitrogen dioxide ($NO_2$). $NO_2$ is toxic and can cause headaches, dizziness and nausea in low doses. It also has an objectionable smell. CO, NOx, soot and HC are legislated so that the levels emitted from a diesel exhaust system to atmosphere must meet prescribed limits. Thus a diesel oxidation catalyst catalyses the oxidative removal of HC, CO and soot as does Johnson Matthey's Continuously Regenerating Trap (CRT™) (see EP-A-0341832). Many vehicles, including buses and trains, are powered by heavy-duty diesel power plants (as defined by the relevant European, US Federal or Californian legislation), all of which met the legislation existing at the time of their production.

EP-A-0560991 and EP-A-0758713 describe processes for removing NOx from the exhaust gas from diesel engines by absorbing it on a solid absorbent while the gas is lean (i.e. lambda>1) as in normal lean-burn engine operation and regenerating the absorbent by intermittently adjusting the gas to a stoichiometric or rich composition. The intermittent adjustment requires engine inlet modification and/or reductant injection, and therefore is unattractive for existing and immediately-available vehicles because of the expense and technical complexity.

The average speed of vehicles in towns and city centres is relatively low. For example, we understand that the average speed in central London, U.K. is about 4 mph. The levels of pollutants, including $NO_2$, in city centre locations can be relatively high, and in cities such as Manhattan in New York, "canyons" are formed between tall buildings and this can prevent polluted air from moving, mixing and becoming diluted by "fresh" air from outside these canyons.

Whilst vehicles powered by diesel power plants used in e.g. city centres meet legislative requirements for NOx, it would be desirable to go beyond the relevant legislation in certain situations in order to reduce the exposure of, e.g. passengers boarding or alighting from a bus, to $NO_2$ and generally to reduce the level of NOx in city centres for environmental reasons.

SUMMARY OF THE INVENTION

We have now found that it is possible to store NOx exhausted from a diesel engine during low load, such idling in city-centre traffic, and to exhaust the stored NOx when traffic conditions permit higher loads on the engine, such as during acceleration and/or at faster, cruising speeds.

According to one aspect the invention provides an exhaust system for a diesel engine, which engine being operable in a plurality of modes including an idling mode, wherein the engine emits a relatively cool exhaust gas, and a running mode, wherein the engine emits a relatively hot exhaust gas, the exhaust system comprising a solid NOx absorbent, whereby NOx is absorbed by the NOx absorbent during said idling mode and is desorbed and passed to atmosphere during said running mode and/or during acceleration from idling to running as the temperature of the exhaust gas increases, wherein during all modes the engine runs lean and the exhaust gas composition is lambda>1.

This discovery has particular application in urban driving where, for example, an exhaust system for a bus powered by a heavy-duty diesel engine can store NOx when the vehicle is idling e.g. picking up and setting down passengers or crawling through city centre traffic, and expel the stored NOx when the bus is able to move at faster speeds e.g. between bus stops or beyond the city centre. Thus, the invention reduces or meets the problem of exposing, e.g. bus passengers or city-centre pedestrians, to $NO_2$ exhausted from the vehicle's engine and can generally improve the air quality in city centres. Depending on the temperature required to desorb the adsorbed NOx, $NO_2$ can be expelled beyond the city centre where there are less people and it can be mixed and diluted with "fresh" air, or travelling between bus stops so that the offensive odour is less concentrated. Similar advantages are derived by use of the invention in trains (passengers at stations are exposed to reduced NOx levels) and generally in vehicles powered by light- and heavy-duty diesel power plants used for urban driving.

DETAILED DESCRIPTION OF THE INVENTION

The diesel engine can be the motive power for a vehicle, especially one operated on a stop/start schedule, such as a taxi delivery van, omnibus, water-bus or passenger train. In idling mode, while passengers are boarding or in stationary or slow-moving traffic, odourless NO, with little $NO_2$, is emitted and undergoes very little oxidation to $NO_2$ owing to high dilution and very slow reaction. By suitable choice of absorber composition and expulsion temperature, the rate of desorption can be slow enough to occupy a substantial part of the vehicle moving time, so that the expelled NOx (having a low $NO_2$:NO ratio at desorption temperature) becomes well diluted. The engine is of course to be used only where pollution regulations permit. The engine may need modification to decrease its normal NOx output, but less than if the invention were not used. Desirably, the engine is fuelled with low-sulfur fuel, i.e. having less than 50, for example under 10, ppm of sulfur, by weight as elemental S.

The exhaust system is used in association with a diesel engine, whether light- or heavy-duty. In preferred embodiments the exhaust system comprises, in order from upstream to downstream as appropriate: a NOx absorber; an oxidation catalyst and NOx absorber; a soot filter and NOx absorber; or an oxidation catalyst, soot filter and NOx absorber.

The most preferred embodiment is the above described combination of oxidation catalyst, soot filter and NOx absorber. Such a combination effects oxidation of NO to $NO_2$, whereafter the $NO_2$ combusts soot collected on the filter. Since some of the $NO_2$ is thereby reduced to NO, the resulting gas is especially suitable for a NOx absorber sized to absorb mainly or only the $NO_2$ component Certain embodiments of this combination are commercially available as Johnson Matthey's CRT™ and are described in U.S. Pat. No. 4,902,487 and EP-A-0341832, the teaching of which are incorporated herein by reference.

The invention is especially beneficial when the exhaust system includes an oxidation catalyst, for example a 2-way catalyst (one that oxidises CO and HC), since such a catalyst can convert NO to $NO_2$. Thus the level of tailpipe $NO_2$ is increased. As mentioned above, an aspect of the present invention is to reduce or prevent NOx and especially $NO_2$ from being exhausted to atmosphere during city centre driving.

The nature of the absorbent can be: (a) compounds, preferably an oxide, of alkali metals, alkaline earth metals, rare earth metals and transition metals capable of forming nitrates and/or nitrites of adequate stability in absorbing conditions and of evolving nitrogen oxides and/or nitrogen in regenerating conditions; or (b) adsorptive materials such as zeolites, carbons and high surface-area oxides, or mixtures of any two or more thereof.

In one embodiment, the absorbent can be catalysed, preferably with one or more platinum group metal. Where an oxidation catalyst is present, this can facilitate oxidation of NO to $NO_2$ so that the $NO_2$ is stored as the nitrate in the NOx absorbent. Without wishing to be bound by theory, we understand that when the exhaust temperature rises, the nitrate becomes thermally unstable releasing the NOx as $NO_2$. We have observed, however, that where an appropriate combination of absorbent materials are used, the primary NOx component released can be NO and not $NO_2$ (with residual oxygen).

Compounds (a) may be present (before NOx absorption) as mixtures and/or composite oxides, e.g. of alkaline earth metal and copper such as Ba—Cu—O or $MnO_2$—$BaCuO_2$, possibly with added Ce oxide, or Y—Ba—Cu—O and Y—Sr—Co—O. (For simplicity the oxides are referred to, but in situ hydroxides, carbonates and nitrates are present, depending on the temperature and gas composition). Whichever compounds are used, there may be present also one or more catalytic agents, such as precious metals, especially platinum group metals (PGMs) such as platinum or palladium, for oxidising NO to $NO_2$. However, it is a feature of the invention that the absorbent need not include a reduction catalyst, such as the PGM rhodium, since the composition of the exhaust gas according to the invention is always at lambda>1. Accordingly, because the gas composition includes net oxidising species, it is more difficult to reduce NOx to $N_2$.

As is known to the skilled person, the exhaust gas temperatures of heavy- and light-duty diesel engines are different. In particular, the exhaust gas temperature of a heavy-duty diesel engine in idling and running modes is higher than in a light-duty diesel engine. Accordingly, in preferred embodiments of the invention, the nature of the absorbent material can be chosen better to match the exhaust gas temperatures encountered in its application in exhaust systems for either heavy- or light-duty diesel engines. More strongly basic oxides e.g. BaO are preferred absorbent materials for heavy-duty applications. Particularly preferred is a barium absorbent including a catalytically effective amount of a PGM e.g. platinum. Weaker basic oxides e.g. CuO or AgO are preferred in light-duty applications. A mixture of copper oxide (200-600 $g/ft^3$) and palladium (50-200 $g/ft^3$) has been found to be especially effective.

Using the preferred absorbent for heavy-duty diesel, net NOx absorption occurs typically at up to 280° C.; it should take place at any lower temperature at which the engine is producing NOx and is typically effective at over 220° C. Net desorption of NOx from the absorbent occurs at from 350-500° C. Using the preferred absorbent for light-duty diesel applications, net absorption occurs typically at from 140-230° C. and net desorption at from 250-300° C. The transition from absorption to desorption in many systems according to the invention can be effected simply by the increase in exhaust temperature due to the change from idling to running. However, a control system as described below can be fitted as a safeguard.

Generally any idling period will in practice include a terminal temperature rise as the transition to a running period. Desirably, the temperature of the gas entering the absorber can be appropriately controlled; if the temperature of the gas entering the absorber is too high, a simple cooling means, such as a finned connector can be inserted upstream of the absorber. If the temperature of the gas entering the absorber is too low, a connector containing an electric heater can be inserted upstream of the absorber. Alternatively the temperature can be increased by adjusting the engine inlet and/or by injecting fuel downstream of the engine, to provide an exotherm over the oxidation catalyst Such adjustment and/or injection is preferably used only at the transition from idling to running mode. The fuel thus introduced does not bring the gas composition outside the required lean range.

The absorber composition can be chosen to absorb preferentially $NO_2$, so that the $NO_2$:NO ratio in the tailpipe gas in the idling mode is relatively low, preferably at a level less than causes objectionable odour. In light-duty diesel application this can range from 5:1 to 0.1:1, whereas in heavy-duty applications the ratio can be from 3:1 to 0.001:1. A useful effect of low absorption of NO is that the volume of the absorbent is less than would be needed for both NO and $NO_2$, thus facilitating retro-fit of a NOx trap in the confined space available on a vehicle.

In a preferred embodiment, the choice of absorbent depends on the temperature available in the running mode. Whichever is used, the transition from absorption corresponds to a change in the position of equilibrium of the reaction:

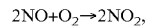

$$2NO+O_2 \rightarrow 2NO_2,$$

the reverse reaction being relatively favoured at desorption temperatures, so that the $NO_2$ content of the expelled gas is relatively low.

According to a preferred embodiment, the invention provides a retro-fit ('bolt-on') NOx absorber with (if not already present) oxidation catalyst or soot filter or both, and also with, if necessary, temperature adjustment means and/or control gear, for application to the engine exhaust pipe or to the outlet of an existing oxidation catalyst and/or soot filter. It provides also combinations of the NOx absorber with exhaust pipe parts, mufflers and muffler parts, catalysts and soot removers, to be fitted to the engine/exhaust system in course of modification or maintenance.

The absorbent is suitably supported on a ceramic or metal honeycomb substrate, the ceramic comprising one or more of alumina, silica, titania, cordierite, zirconia, silicon carbide or other, generally oxidic, material. The substrate carries a washcoat and, in one or more layers thereon, is the active absorptive material. The honeycomb has typically 50-600 cells per square inch (cpsi), optionally more, e.g. up to 1200 cpsi or more if composed structurally of metal. Generally the range 100-900 cpsi is preferred. The absorbent or part thereof can be on the outlet side of the filter, described below.

Where present, the oxidation catalyst, the active material comprises generally a platinum group metal (PGM), especially platinum and/or palladium, optionally with other PGMS, e.g. rhodium, and other catalytic or promoting components. The exact compositions and structure of the oxidation catalyst may be varied according to the requirements of its application. A low temperature light-off formulation is generally preferred. Usually such catalyst is supported on a structure of the same type as described above for the absorbent Suitable PGM loadings are in the range 20-200 g/ft$^3$ on a honeycomb having 400 cpsi, with corresponding loadings at other cell densities. The oxidation catalyst may be designed and/or operated to provide oxidation of gaseous hydrocarbons and CO, and/or of soot-carried hydrocarbons, but primarily to oxidise NO to $NO_2$.

Where present, the soot filter is preferably capable of collecting soot without causing excessive back-pressure in the exhaust system. In general, ceramic, sintered metal or woven or non-woven wire filters are usable, and wall-flow honeycomb structures are particularly preferred. The structural material of the filter is preferably a porous ceramic oxide, silicon carbide or sintered metal. The filter can be catalysed, e.g. it may include an alumina coating and/or a base metal catalyst such as $La/Cs/V_2O_5$. The soot is generally carbon containing soluble organic fractions (SOF) and/or volatile organic fractions (VOF) and/or heavy hydrocarbons. Combustion of soot produces carbon oxides and $H_2O$. The system is advantageously applied to a heavy-duty engine, e.g. over 4 litres, since the exhaust of such an engine can readily attain the preferred temperatures as described herein. The filter in such a system may have sufficient capacity to operate without accumulation requiring a gas bypass.

Advantageously, the system may further comprise sensors, indicators, computers and actuators, effective to maintain operation within desired conditions. Preferably a means for controlling regeneration of the NOx absorbent includes a computer which can be part of the engine management unit if desired. Control of the system can be regulated with open or closed feedback using information gathered from the sensors, indicators, etc.

Preferably the means for controlling the regeneration of the absorber performs one or more of the following illustrative techniques:

(a) ultimate detection of NOx leakage from or "slip" past the NOx absorber;

(b) regeneration responsive to prediction based on input of data on times in idling and running modes and rate of change from idling to running and back; and (c) allowance for gas composition variations, for example non-steady conditions such as incomplete warm-up or weather.

The control means may include sensors for at least one of: fuel composition; air/fuel ratio; exhaust gas composition (including tail-pipe $NO_2$) and temperature at one or more points along the exhaust system; and pressure drop, especially over the filter, where present. It may include also indicator means informing the engine operator, computer means effective to evaluate the data from the sensor(s), and control linkages effective to adjust the engine to desired operating conditions taking account of e.g. start-up, varying load and chance fluctuations.

In addition, the system may include routine expedients, for example exhaust gas recirculation (E.G.R); and means such as cooling, or electric heating, to adjust the temperature of the gas to a level preferred for nearer optimum operation of downstream components.

According to a further aspect, the invention provides a process for treating diesel exhaust gas from an engine operated in a plurality of modes including an idling mode, wherein the engine emits a relatively cool exhaust gas, and a running mode, wherein the engine emits a relatively hot exhaust gas, which process comprising the steps of absorbing NOx on a regenerable NOx absorbent during said idling mode and desorbing the NOx and passing it to atmosphere by intermittently increasing the temperature of the exhaust gas, wherein during all modes the engine runs lean and the exhaust gas composition is lambda>1.

According to a preferred embodiment the process, further comprises the steps, before absorbing the NOx, of catalysing oxidation of NO to $NO_2$; collecting soot on a filter; and combusting said soot by reaction with said $NO_2$.

Most preferably, the process according to the invention is performed on an exhaust gas which is the product of combustion of a fuel containing less than 50 ppm w/w of sulphur.

Whereas in the prior processes referenced above the regeneration phase using rich gas is a small fraction of engine running time, in operating the exhaust system according to the invention the desorption phase will generally be long and can spread NOx desorption over a time and distance sufficient to avoid offence. Typically the ratio of running time to idling time is in the range 0.1 to 100.

BRIEF DESCRIPTION OF THE DRAWINGS

In order that the invention may be more fully understood, reference will now be made to the following illustrative Examples and to the accompanying drawings, wherein.

Figure 1:
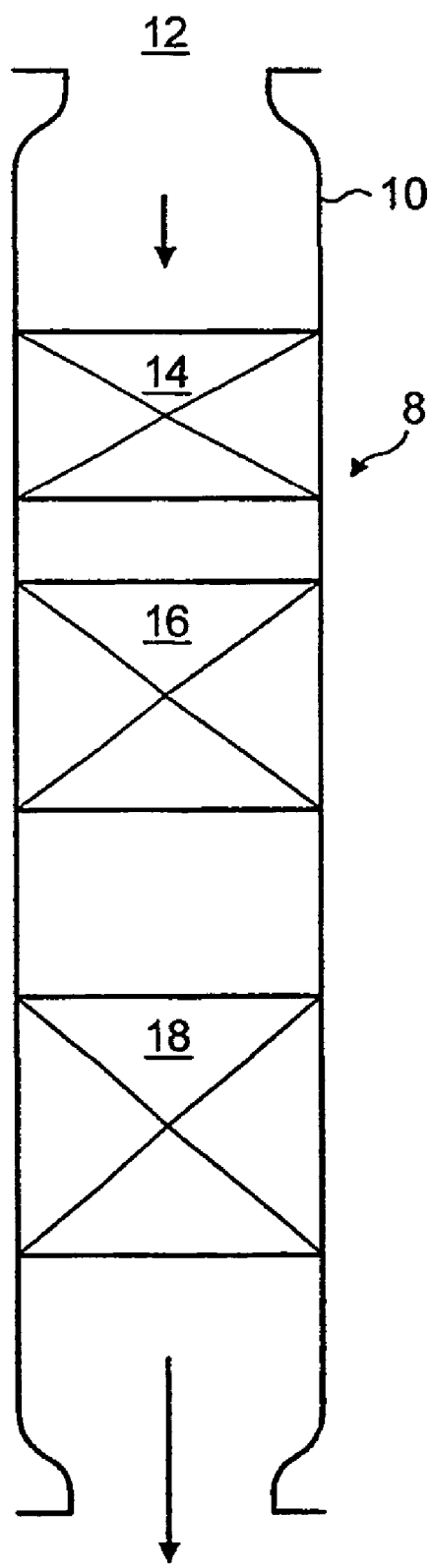
FIG. 1 is a schematic illustration of a diesel exhaust system representing a preferred embodiment according to the invention.

The system 8 comprises a "can" 10, connected at 12 to a conduit carrying the exhaust from a diesel engine (not shown) fuelled with diesel fuel of under 50 ppm sulphur content, and having no exhaust treatment components upstream of the illustrated system. At the inlet end of can 10 is catalyst 14, which is a low temperature light-off oxidation catalyst supported on a 400 cells/in$^2$ ceramic honeycomb monolith. Catalyst 14 is an oxidation catalyst designed to be capable of meeting emission regulations in relation to CO and HC for the engine and vehicle and also converts at least 70% of the NO to $NO_2$ at 400° C. (If the engine already has such a catalyst, e.g. close-coupled to the exhaust manifold, that catalyst would function as item 14 and items 16 and 18, to be described, could be in a separate can and retrofitted).

The gas leaving catalyst 14 passes into soot filter 16, which is of the ceramic wall flow type. The $NO_2$ and surplus oxygen in the gas oxidise the soot at temperatures around 250° C. with reduced accumulation or tendency to blocking. (If the engine already has a soot filter, or CRT—i.e. oxidation catalyst+soot filter—item 18, to be described, could be in a separate can and retrofitted).

The gas leaving filter 16 enters NOx absorber 18, which may be all in one or more distinct beds or may be at least in part present as a coating on the outlet side of filter 16. During idling operation of the engine, as when a bus is picking up passengers, NOx absorber 18 substantially removes all $NO_2$ flowing but a limited amount of NO. The NO is odourless, however, and is less offensive to pedestrians. When, however, the engine is speeded up to running mode, as in driving to the next bus-stop, or away from a city centre, NO is expelled, along with some $NO_2$. However, movement of the bus dilutes the small amount of $NO_2$ sufficiently to avoid offence.

EXAMPLE 1

A synthetic gas simulating diesel exhaust (except for containing no reductant) leaving soot filter 16 and having the following v/v composition was used:

| | |
|---|---|
| $CO_2$ | 10.0% |
| $H_2O$ | 10.0% |
| $O_2$ | 5.0% |
| NO | 60 ppm |
| $NO_2$ | 30 ppm |
| $N_2$ | balance |

Figure 2:
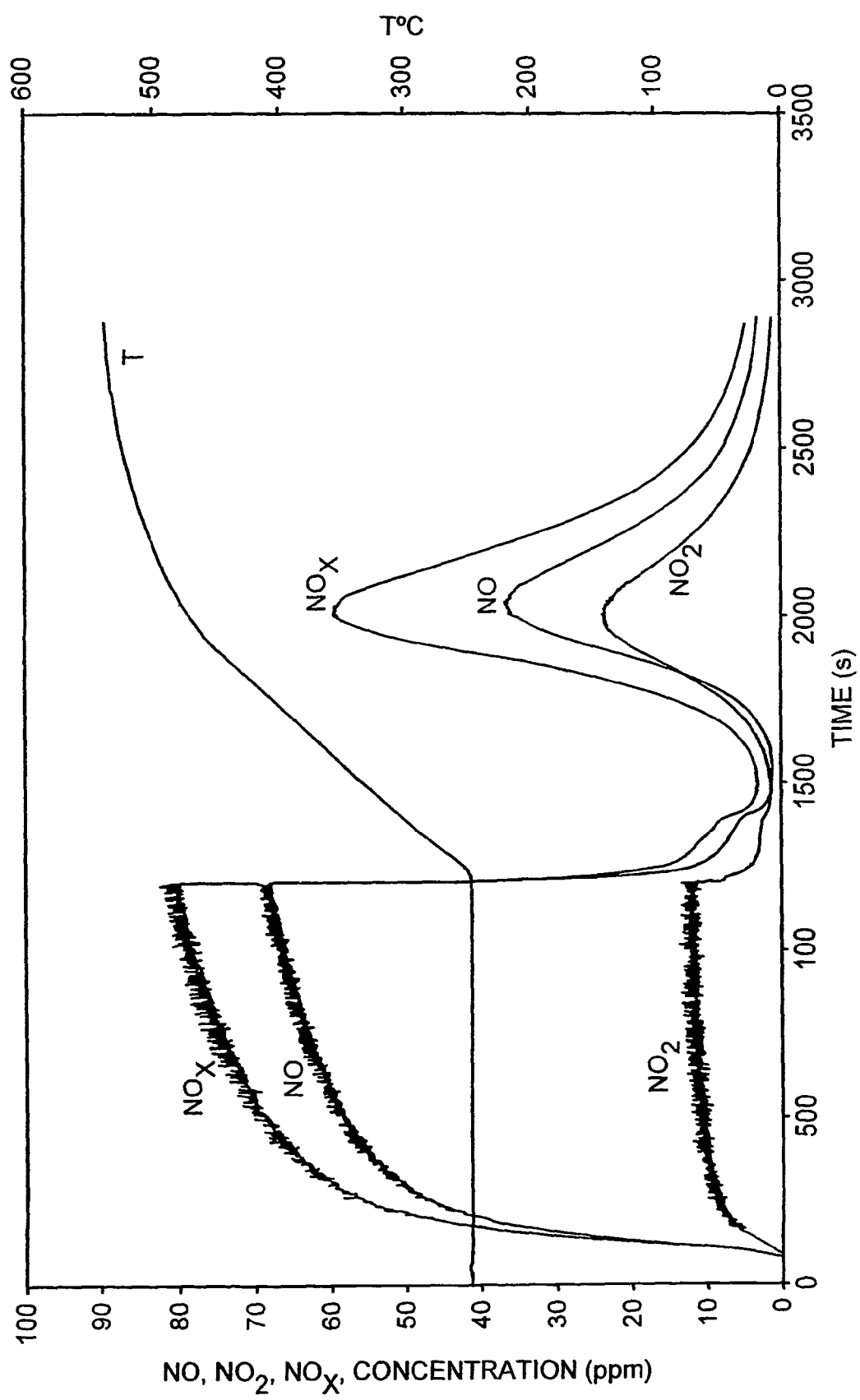
FIG. 2 is a graph showing the variation with time of the composition of a diesel exhaust gas from a diesel engine including an exhaust system according to the invention.
Figure 3:
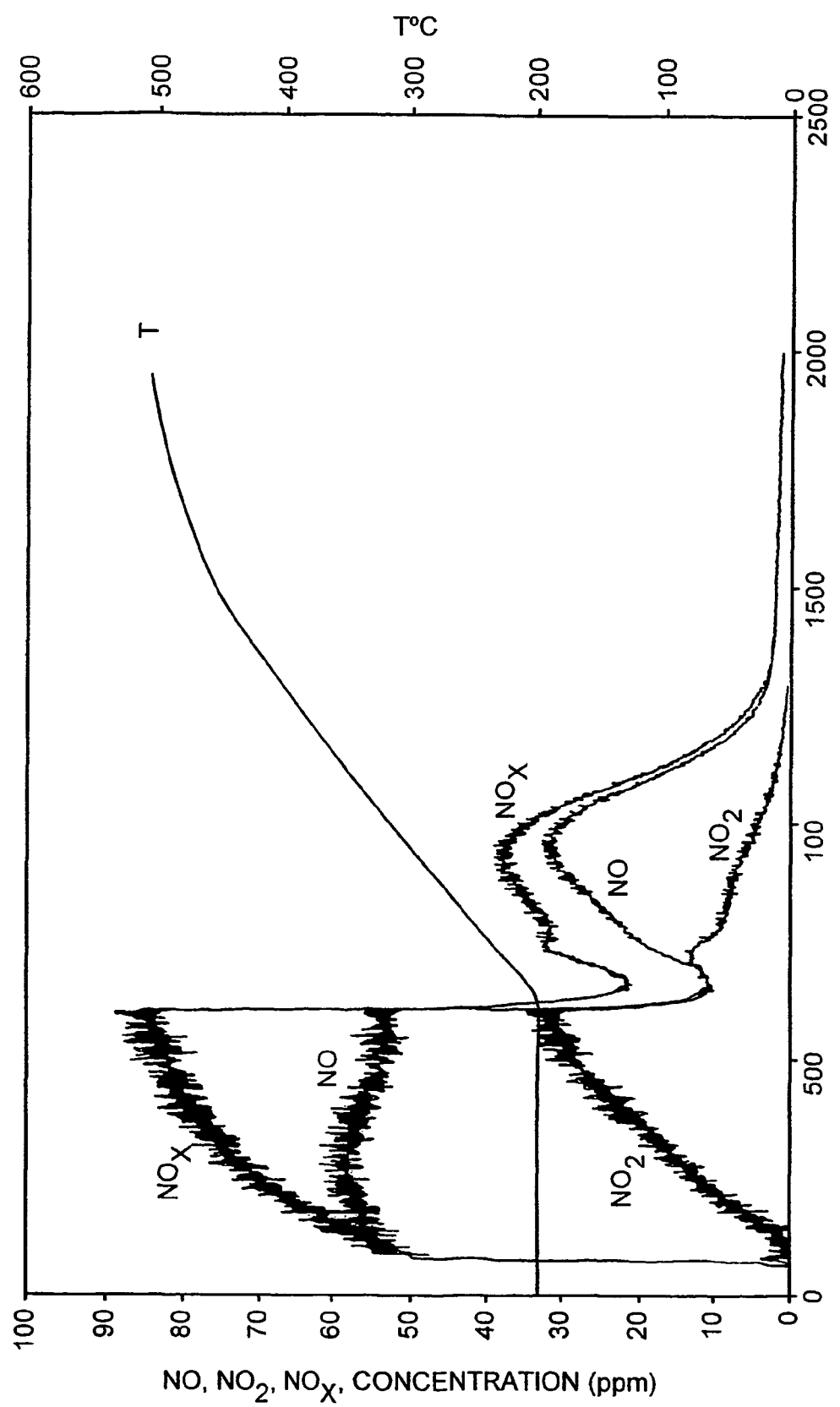
FIGS. 3 and 4 are graphs showing the variation with time of the NOx components of a diesel exhaust gas from a diesel engine including an exhaust system according to the invention.
Figure 4:
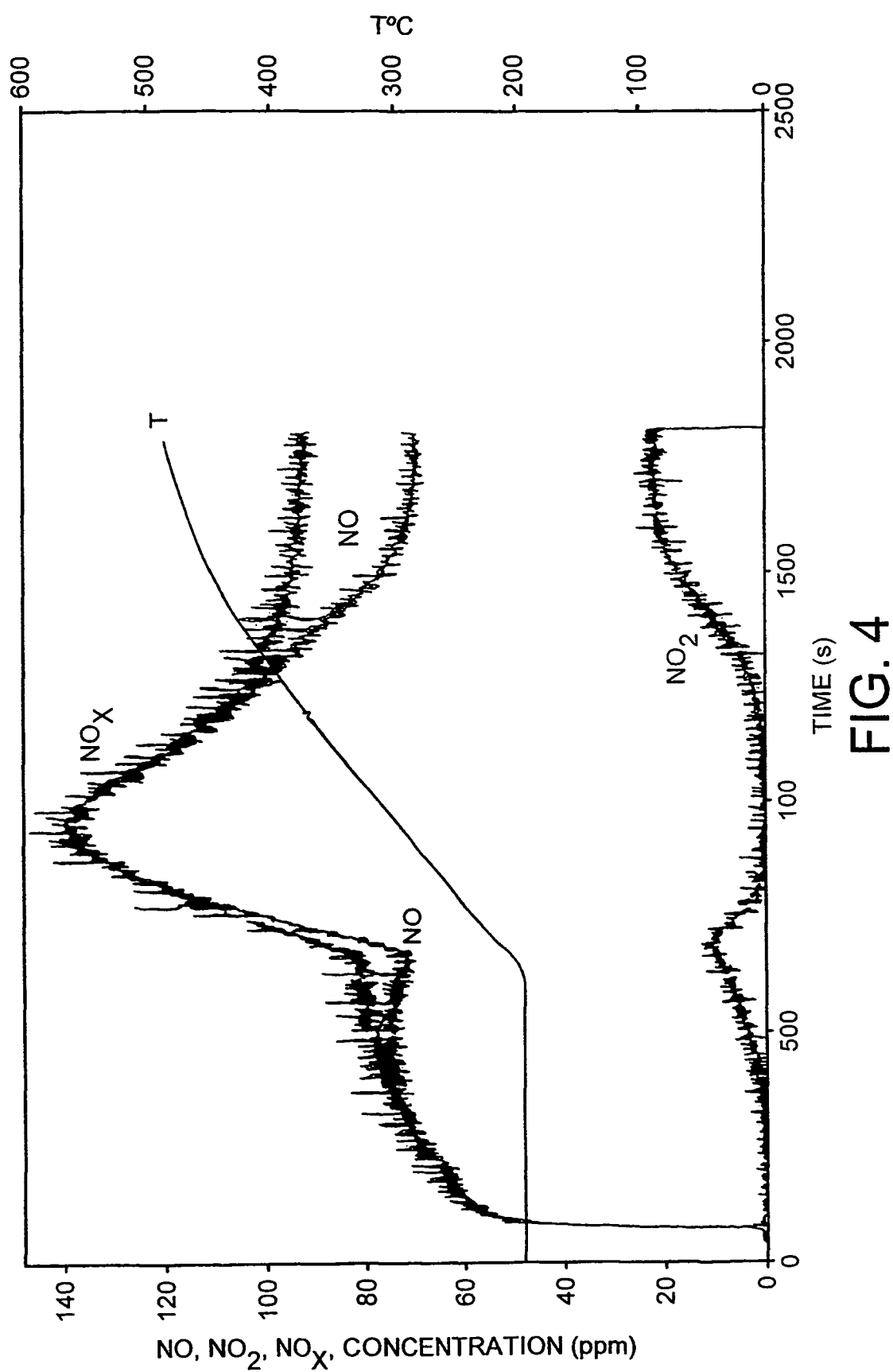

This gas was passed at 200 or 250° C. (as described below) over NOx absorbents as follows:

(a) At 250° C. for 1200 seconds over a cordierite honeycomb of 400 cpsi carrying an alumina washcoat layer and an absorbent layer of BaO with Pt 100 g/ft$^3$ and Rh 10 g/f$^3$ and minor proportions of alumina, ceria and $ZrO_2$. The results are shown in FIG. 2;

(b) At 200° C. for 600 seconds over a cordierite honeycomb having 400 cpsi, carrying an alumina washcoat and 400 g/ft$^3$, calculated as Cu, of CuO. The results are shown in FIG. 3;

(c) At 200° C. for 600 seconds over a cordierite honeycomb having 400 cpsi, carrying an alumina washcoat, 400 g/ft$^3$, calculated as Cu, of CuO and 100 g/f$^3$ of Pd, calculated as metal. The results are shown in FIG. 4.

For each the outlet gas was analysed for NO and $NO_2$ at intervals. The results are shown in the accompanying FIGS. 2-4. Leading data are summarised in Table 1.

TABLE 1

| Temp ° C. Abst | 250 FIG. 2 | | 200 FIG. 3 | | 200 FIG. 4 | |
|---|---|---|---|---|---|---|
| NOx | NO | $NO_2$ | NO | $NO_2$ | NO | $NO_2$ |
| Secs 0-100 | 0 | 0 | 0 | 0 | 0 | 0 |
| 200 | 30 | 6 | 55 | 10 | 63 | 1 |
| 600 | 61 | 11 | 52 | 30 | 71 | 6 |
| 1200 | 68 | 12 | — | — | — | — |

From FIG. 2 it is evident that, even up to 1200 seconds (20 minutes), the emission of $NO_2$ is low (12 ppm), and can be expected to be below the objectionable stench level in a real situation, such as for a bus with its engine idling while setting down and picking up passengers. At the same time the emission level of NO steadily increases, but this causes no stench, because NO is odourless and forms $NO_2$ in air very slowly and at high dilution. Since the $NO_2$ level is rising only slowly, a yet longer idling period would be tolerable.

From FIG. 3 it is evident that emission of $NO_2$ is almost zero for about 100 seconds, then increases slowly to 30 ppm at 600 seconds. Thus there would be no objectionable odour at en-route bus stops. The NO emission after an initial increase is about constant between 50 and 60 ppm.

From FIG. 4 the emission of $NO_2$ is about zero for 300 seconds and reaches only 6 ppm at 600 seconds. The NO emission increases to about 70 ppm and levels out.

Evidently this absorbent provides a useful margin of safety in suppression of objectionable odour.

To test the regenerability of the absorbent, the gas composition was adjusted, for (a) and (b) but not (c), by stopping the flow of NOx. The inlet temperature was then ramped at about 0.25° C. per second.

Initially the measured $NO_2$ level did not increase much:

(a) In FIG. 2: up to 1600 seconds at 350° C. it was not over 3 ppm. Hence the initial acceleration of a bus from a bus stop would cause minor if any stench. At 2000 seconds, 470° C., desorption is rapid and the emitted gas contains 23 ppm of $NO_2$ and 36 ppm of NO. The absorbent of FIG. 2 is thus to be used when the engine running mode produces very hot exhaust gas or other heating is available;

(b) In FIG. 3: desorption equally of $NO_2$ and NO (10 ppm each) began very shortly after the start of the rise in temperature. However, 100 seconds later (300° C.), preferential desorption of NO set in and at about 1000 seconds the NO content (300 ppm) of the desorbed gas was about 5 times that of $NO_2$; and (c) In FIG. 4: up to 1400 seconds at 400° C. the $NO_2$ level was not over 6 ppm, its level at the end of the previous steady run at 200° C. In this time period, especially at 1000 seconds at 300° C., NO was copiously emitted (135 ppm). This absorbent evidently takes in $NO_2$ but emits NO. It is especially useful when running mode exhaust is at a moderate temperature.

EXAMPLE 2

The exhaust gas from a production VOLVO 12-litre diesel engine was fed to a ceramic honeycomb-supported platinum/alumina oxidation catalyst, in which its content of NO was about 90% oxidised to $NO_2$. The resulting gas was fed to a NOx absorber as used in the run reported in Example 1. The results are shown graphically in FIG. 2. The engine was operated in idling and high-speed conditions, alternating at 850 second intervals. Representative values of temperature, composition v/v and flow rate of the gas leaving the absorber in idling and high-speed conditions, as obtained reproducibly over many cycles, are set out in Table 2.

TABLE 2

| | Idle (absorbing) | High Speed (regenerating) |
|---|---|---|
| Temp ° C. | 150 | 380 |
| $NO_2$, ppm | 10 | 260 |
| NO, ppm | 180 | 455 |
| $O_2$, % | 19 | 10.9 |
| CO, % | 0.4 | 0.8 |
| $CO_2$, % | 1.38 | 7.14 |
| HC, ppm | 19 | 5.7 |
| Total flow kg/h | 259 | 560 |
| $NO_2$, g/h | 2.59 | 145.60 |
| NO, g/h | 46.62 | 254.80 |
| $NO_2$/NOx % | 5.3 | 35.6 |

It is evident that the rate of emission of $NO_2$ in idling is low and may cause little if any offence. At the higher temperature the gas contains both the $NO_2$ leaving the oxidation catalyst and the $NO_2$ desorbed from the absorber. However, the major part of the total NOx is NO, which is relatively inoffensive; reformation of $NO_2$ by reaction of NO with atmospheric oxygen is a slow reaction, especially at the high dilution due to vehicle movement The above data relate to the case in which maximal $NO_2$ is fed to the absorber. Applying these results to a process in which the gas leaving the oxidation catalyst passes through a soot filter, where the reaction

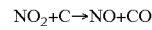

takes place, it is evident that the $NO_2$/NOx ratio of the gas emitted would be still lower.

The invention claimed is:

1. An exhaust system for a diesel engine, which engine being operable in a plurality of modes including an idling mode during which the engine emits a relatively cool exhaust gas and a running mode during which the engine emits a relatively hot exhaust gas, the exhaust system comprising a solid NOx absorbent, wherein NOx in an exhaust gas is absorbed by the NOx absorbent during said idling mode and is desorbed and passed to atmosphere during said running mode, during acceleration from idling to running or during said running mode and during acceleration from idling to running mode, as the temperature of the exhaust gas increases, wherein during all modes the engine runs lean and the exhaust gas composition is lambda>1; and a soot filter upstream of the NOx absorbent.

2. An exhaust system according to claim 1, further comprising an oxidation catalyst upstream of the NOx absorbent.

3. An exhaust system according to claim 1, further comprising an oxidation catalyst and a downstream filter upstream of the NOx absorbent.

4. An exhaust system according to claim 1, wherein the NOx absorbent comprises at least one of: (a) an alkali metal compound, an alkaline earth metal compound, a rare earth metal compound and a transition metal compound capable of forming a nitrate, capable of forming a nitrite or capable of forming both a nitrate and a nitrite, which nitrate or nitrite having adequate stability in absorbing conditions and being capable of evolving nitrogen oxides, nitrogen or nitrogen oxides and nitrogen in regenerating conditions; (b) an adsorptive material; and (c) mixtures of (a) and (b).

5. An exhaust system according to claim 4, wherein the absorbent is catalyzed.

6. An exhaust system according to claim 5, wherein the catalyst of the absorbent comprises at least one platinum group metal.

7. An exhaust system according to claim 4, wherein the NOx absorbent comprises (a) and the at least one alkali metal compound, alkaline earth metal compound, rare earth metal compound or transition metal compound is an oxide thereof.

8. An exhaust system according to claim 4, wherein the NOx absorbent comprises (b) and the at least one adsorptive material is selected from the group consisting of zeolites, carbons and high surface-area oxides.

9. A diesel engine including an exhaust system according to claim 1.

10. A heavy-duty diesel engine according to claim 9.

11. An exhaust system according to claim 1, wherein the NOx absorbent comprises BaO.

12. An exhaust system according to claim 1, wherein the NOx absorbent comprises CuO.

* * * * *